US009165466B2

(12) United States Patent
Yi et al.

(10) Patent No.: US 9,165,466 B2
(45) Date of Patent: Oct. 20, 2015

(54) METHOD OF SPEEDING CALL FLOW

(75) Inventors: Ki Hak Yi, Windsor (CA); Christopher N. Shamoun, Commerce Township, MI (US); James Doherty, Wyandotte, MI (US)

(73) Assignee: General Motors LLC, Detroit, MI (US)

( * ) Notice: Subject to any disclaimer, the term of this patent is extended or adjusted under 35 U.S.C. 154(b) by 1087 days.

(21) Appl. No.: 13/160,853

(22) Filed: Jun. 15, 2011

(65) Prior Publication Data

US 2012/0320825 A1  Dec. 20, 2012

(51) Int. Cl.
| H04L 12/66 | (2006.01) |
| G08G 1/0968 | (2006.01) |
| H04W 76/02 | (2009.01) |
| H04W 4/04 | (2009.01) |

(52) U.S. Cl.
CPC ......... *G08G 1/096811* (2013.01); *H04W 4/046* (2013.01); *H04W 76/025* (2013.01)

(58) Field of Classification Search
CPC .................. G08G 1/096844; G08G 1/096811; G08G 1/096883; G08G 1/096872; G08G 1/096861; G08G 1/096838; H04W 4/046
USPC ........... 370/328, 352–354, 356; 701/522, 537
See application file for complete search history.

(56) References Cited

U.S. PATENT DOCUMENTS

| 6,876,634 | B1 * | 4/2005 | Lim .......................... 370/310.1 |
| 8,270,982 | B2 * | 9/2012 | Yi et al. ....................... 455/442 |
| 2003/0083079 | A1 * | 5/2003 | Clark et al. ................... 455/466 |
| 2005/0049021 | A1 * | 3/2005 | Nedelcu et al. ............ 455/575.9 |
| 2005/0171686 | A1 * | 8/2005 | Davis .......................... 701/200 |
| 2006/0211446 | A1 * | 9/2006 | Wittmann et al. .......... 455/552.1 |
| 2008/0075067 | A1 * | 3/2008 | Guglielmi et al. ............ 370/352 |
| 2009/0043502 | A1 * | 2/2009 | Shaffer et al. ................. 701/213 |
| 2011/0003585 | A1 * | 1/2011 | Wang et al. ................... 455/418 |
| 2011/0039533 | A1 | 2/2011 | Yi et al. |
| 2011/0153742 | A1 * | 6/2011 | Sloop et al. ................... 709/204 |
| 2012/0052854 | A1 * | 3/2012 | DiMeo et al. ................. 455/419 |
| 2014/0045453 | A1 * | 2/2014 | Johnson ........................ 455/406 |

OTHER PUBLICATIONS

3GPP TS 22.060 V10.0.0 (Mar. 2011); Technical Specification Group Services and System Aspects; General Packet Radio Service (GPRS); Service description; Stage 1 (Release 10), 26 pages.

* cited by examiner

*Primary Examiner* — Hoang-Chuong Vu
(74) *Attorney, Agent, or Firm* — Anthony Luke Simon; Reising Ethington P.C.

(57) ABSTRACT

A system and method for communicating between a vehicle and a central facility includes initiating at a vehicle a request for turn-by-turn directions; establishing a packet-switched call between the vehicle and a central facility using a wireless carrier system and a mobile dialed number (MDN) associated with the vehicle; receiving determined route information at the vehicle from the central facility via the packet-switched call; offering a vehicle occupant a service option that uses a circuit-switched call; and if the vehicle occupant accepts the service option, directing the wireless carrier system to establish the circuit-switched call using the MDN while maintaining the packet-switched call in a dormant state.

18 Claims, 2 Drawing Sheets

METHOD OF SPEEDING CALL FLOW

TECHNICAL FIELD

The present invention relates generally to vehicles and more particularly to communicating between a vehicle and a central facility.

BACKGROUND OF THE INVENTION

Modern vehicles are capable of offering a large number of services to vehicle occupants. Using vehicle telematics devices, vehicle occupants can communicate both voices and data with outside parties, such as central facilities or third party callers. In one example, vehicle occupants can request and receive assistance and/or services from a central facility, such as a call center that is staffed with call advisors. For instance, a vehicle occupant can place a request to the central facility for navigational directions from one geographical place to another; this request is often called a request for turn-by-turn directions. The process of carrying out this request can involve initiating and ending a plurality of data and voice calls. Sometimes, the quantity of calls and/or the amount of time spent initiating and ending those calls during the request can extend the amount of time that elapses between requesting the turn-by-turn directions and actually receiving those directions.

SUMMARY OF THE INVENTION

According to an aspect of the invention, there is provided a method of communicating between a vehicle and a central facility. The method includes initiating at a vehicle a request for turn-by-turn directions; establishing a packet-switched call between the vehicle and a central facility using a wireless carrier system and a mobile dialed number (MDN); offering a vehicle occupant a service option that uses a circuit-switched call; if the vehicle occupant accepts the service option, directing the wireless carrier system to establish the circuit-switched call using the MDN while maintaining the packet-switched call in a dormant state; and receiving determined route information at the vehicle from the central facility via the packet-switched call.

According to another aspect of the invention, there is provided a method of communicating between a vehicle and a central facility. The method includes receiving at a central facility vehicle identity information and a request for turn-by-turn directions sent from the vehicle via a wireless carrier system; establishing a packet-switched call between the vehicle and the central facility using the wireless carrier system and a mobile dialed number (MDN); receiving a request from the vehicle for a service option that uses a circuit-switched call; directing the wireless carrier system to establish the circuit-switched call using the MDN and to maintain the packet-switched call in a dormant state; and sending a determined turn-by-turn route from the central facility to the vehicle via the packet-switched call.

According to yet another aspect of the invention, there is provided a method of communicating between a vehicle and a central facility. The method includes receiving a request for turn-by-turn directions from a vehicle that also includes vehicle identifying information and the mobile dialed number (MDN); establishing a packet-switched call between the central facility and the vehicle via a wireless carrier system based on the request; offering a vehicle occupant in the vehicle a service option that uses a circuit-switched call; if the vehicle occupant selects the service option, then directing the wireless carrier system to establish the circuit-switched call while maintaining the packet-switched call in a dormant state, wherein both the packet-switched call and the circuit-switched call are simultaneously connected through the wireless carrier system using the MDN; receiving voice communication for turn-by-turn directions at the central facility from the vehicle occupant via the circuit-switched call; ending the circuit-switched call; and sending a response to the request for turn-by-turn directions via the re-activated packet-switched call.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

Figure 1:
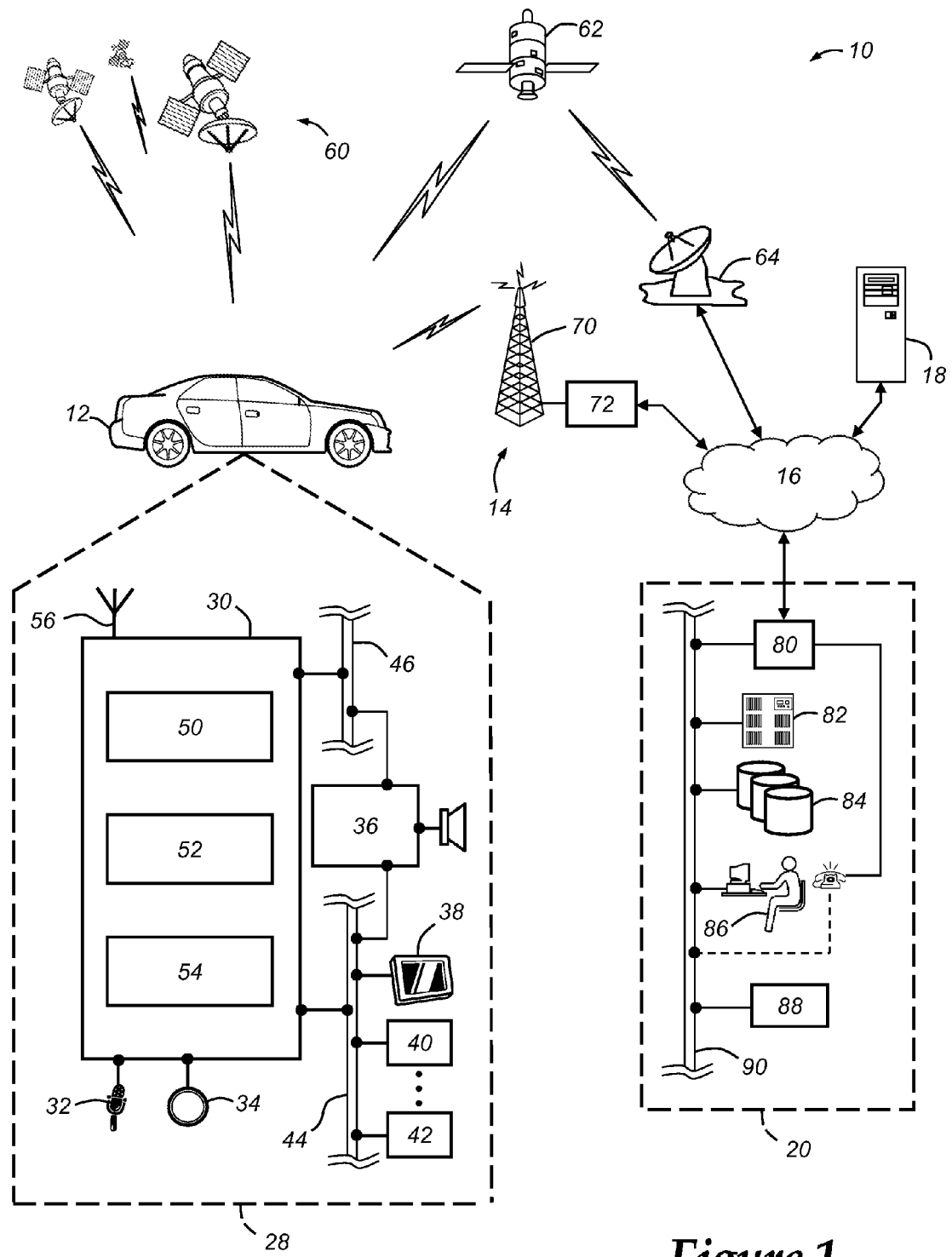
FIG. 1 is a block diagram depicting an exemplary embodiment of a communications system that is capable of utilizing the method disclosed herein.

The method described below helps shorten the response time to requests for telematics service(s). Generally, requests for telematics services, such as turn-by-turn directions, involve two types of calls—circuit-switched and packet-switched. Each type of call may be initiated and ended in the process of providing turn-by-turn directions to a vehicle. The initiation and termination of these calls occupies a certain length of time to carry out, which invariably delays the ultimate delivery of service to the requestor. In addition, circuit-switched calls may be used in a voice mode for carrying voice transmissions and a data mode for carrying data transmission. And the process of responding to service requests can involve switching between data and voice modes.

Regardless of whether responding to requests for telematics services involves different types of calls or different modes, all of these actions consume time that can delay the response. A typical request for telematics services can include an extended call flow that involves both circuit- and packet-switched calls as well as communicating via voice and data modes. For instance, a vehicle occupant can request telematics services by pressing a button located in the vehicle. This action can initiate a circuit-switched call from the telematics unit in the vehicle to the call center. Once this call is established, the vehicle can initially enter a data mode and transmit data that identifies the vehicle over this call. This data can include a vehicle identifier (ID), telematics subscriber information, or vehicle location, to name a few, all of which can be transmitted before the vehicle occupant speaks with an advisor at the central facility. This may only take seconds or a fraction of a second and not even be noticed by the vehicle occupant. After this data has been transmitted from the vehicle, the telematics unit can switch to voice mode from data mode and the vehicle occupant can verbally request service, such as turn-by-turn directions from the advisor. The advisor can then generate turn-by-turn directions and send them as data to the telematics unit. To do so, the central facility instructs the telematics unit to release the circuit-switched call and establish a packet-switched call with the vehicle. Using the packet-switched call, the central facility sends the generated turn-by-turn directions to the telematics device. As appreciated from this example, the mode changes and generation of multiple calls can delay the receipt of service at the vehicle side.

In contrast, it is possible to more quickly provide telematics service to a vehicle occupant by using "hotline" telephone numbers that can be used and/or maintained by a wireless carrier system to provide special features to calls using those numbers. These special features can be customizable depending on how the hotline telephone number will be used. For instance, the wireless carrier system usually only permits the telematics device (or any wireless device for that matter) to establish one call at a time. Or in other words, the wireless carrier system usually permits one mobile identification number (MIN) and/or mobile dialed number (MDN) per call. However, a hotline telephone number can be configured to permit the simultaneous operation of multiple calls. This configuration can be used to more efficiently process telematics service requests from vehicle occupants. Use of the hotline telephone number can allow the wireless carrier system to receive instructions directing it to establish both a packet switched call and a circuit-switched call so that the calls are maintained at the same time based on directions received from the telematics device and/or the central facility. Doing so can involve placing one call in a dormant state while the other call is used. That way, switching between a circuit-switched call and a packet-switched call or vice-versa can be done much faster that if one call is terminated before the other is established.

In one example, a request for telematics services at the vehicle can begin by establishing a packet-switched call between the vehicle and the central facility. During the packet-switched call, the telematics unit can send information to the central facility that identifies the vehicle to the facility. If the vehicle occupant wishes to speak with the advisor, a circuit-switched call can be established. Instead of ending the packet-switched call, it can be placed in a stand-by or dormant condition. The vehicle occupant can verbally request telematics service from the advisor, such as turn-by-turn directions, which the central facility can generate. The central facility can terminate the circuit-switched call and end the standby/dormant condition of the packet-switched call. Subsequently, the central facility can transmit the generated turn-by-turn directions to the telematics unit. This will be explained in more detail below.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
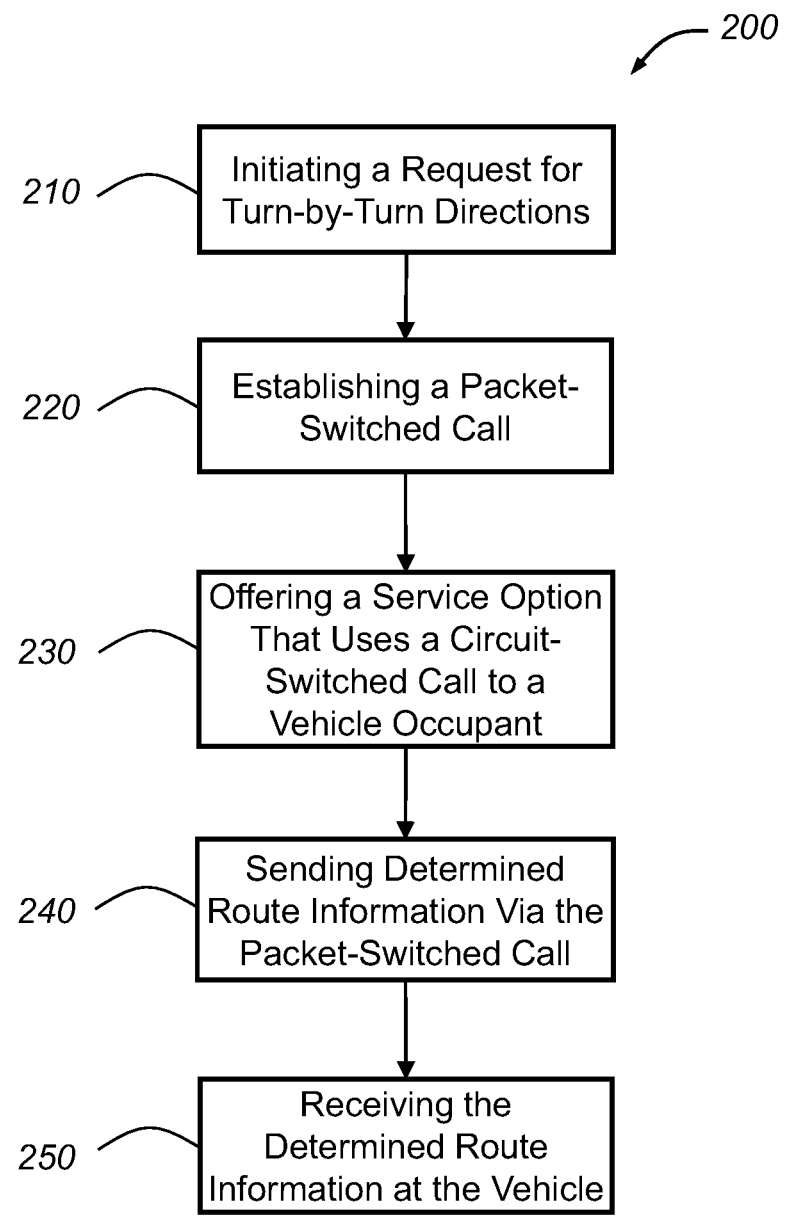
FIG. 2 is a flow chart of a method of communicating between a telematics unit and a central facility.

Turning now to FIG. 2, there is shown an embodiment of a method 200 of communicating between the vehicle 12 and a central facility. The method 200 begins at step 210 by initiating a request at the vehicle 12 for telematics service, such as turn-by-turn directions, and sending information identifying the vehicle 12 to the central facility via the wireless carrier system 14. In this embodiment, the central facility will be described with respect to the call center 20. The request for turn-by-turn directions can be ultimately received at the call center 20 from the vehicle 12, which may also include vehicle identifying information and the mobile dialed number (MDN) associated with the telematics unit 30. These actions can be accomplished in a variety of ways. For example, the vehicle occupant can initiate the request by pressing a button located within the vehicle 12. This action can direct the telematics unit 30 to automatically send information to the call center 20, such as a mobile identification number (MIN), a mobile dialed number (MDN), a vehicle identifier (VIN), telematics subscriber information, or a vehicle location.

This request for turn-by-turn directions can also involve more than a button push. For instance, the vehicle occupant could be presented with an option for turn-by-turn directions on a visual display 38. By selecting this option, the visual display 38 can respond by offering additional input options to the vehicle occupant. The additional input options may be helpful if the vehicle occupant would like to enter an address or a description of a point of interest that can include possible destinations that are received by the telematics unit 30 using a keyboard. The keyboard can be visually generated using the visual display 38, which can also receive tactile input from the vehicle occupant and is electrically connected to the telematics unit 30. However, it is also possible to use a physical device that is dedicated to receiving input (e.g. numbers and letters) from the vehicle occupant. When the vehicle occupant enters the destination address or point of interest description in the vehicle 12, it is possible that the vehicle occupant may receive turn-by-turn directions without ultimately speaking with an advisor at the call center 20.

At step 220, a packet-switched call can be established between the vehicle 12 and the call center 20. In one example, the request for turn-by-turn directions can be transmitted from the vehicle 12 to the call center 20 via the established packet-switched call. Once the call center 20 receives identifying information from the vehicle 12, the call center 20 can then communicate via the packet-switched call with the vehicle 12. Additionally, information received by the call center 20 (e.g. an address entered at the vehicle 12) via the packet-switched call can be used to generate turn-by-turn directions. The method 200 proceeds to step 230.

At step 230, a vehicle occupant is offered a service option that uses a circuit-switched call. In one example, the service option may be an option to verbally communicate with an advisor 86. During the request for turn-by-turn directions, the vehicle occupant may wish to verbally communicate with an advisor located at the call center 20. This service option may be offered when the vehicle occupant did not enter the address/point of interest information described above that would permit the call center 20 to generate turn-by-turn directions without verbal input. If the vehicle occupant selects the service option, either the call center 20 or telematics unit 30 can direct the wireless carrier system 14 to place the packet-switched call in a dormant or standby state, in which case the telematics unit 30 or call center 20 can send a message to the wireless carrier system 14 via a traffic channel directing the system 14 to maintain the packet-switched call in a dormant or standby state. It is possible for the telematics unit 30 or call center 20 to then establish a circuit-switched call while maintaining the packet-switched call in the dormant/standby mode. That is, both a circuit-switched call and a packet-switched call can be simultaneously maintained using one MIN/MDN. This may be done if the vehicle occupant would like to speak with an advisor at the call center 20. While requests for turn-by-turn directions can be carried out without establishing the circuit-switched call, some vehicle occupants may be unwilling or unable to enter the address/point of interest input at the vehicle 12, as was described with respect to step 210. In those circumstances, the occupant can verbally describe the requested turn-by-turn directions.

The act of placing the packet-switched call in a dormant state can be accomplished by arranging to use a "hotline" telephone number that is serviced by the wireless carrier system 14. Hotlining can be described as providing the wireless carrier system 14 with the capability to permit services to users that would otherwise be unauthorized. In doing so, unique telephone numbers can be used by the wireless carrier system 14 to permit calling parties (in this case, the telematics unit 30 and the call center 20) to carry out actions not usually permitted. Here, unique hotline numbers can allow the telematics unit 30 and/or the call center 20 to direct the wireless carrier system 14 to maintain both the circuit-switched call as well as the packet-switched call using a single MIN/MDN (or other vehicle/telematics unit identifier). Using the circuit-switched call, the vehicle occupant can speak with the advisor 86 to verbally ask for turn-by-turn directions and/or make requests that may or may not be related to the request for turn-by-turn directions. Once voice communication(s) requesting turn-by-turn directions are received at the call center 20 from the vehicle occupant via the circuit-switched call, the information conveyed in those communication(s) can be used to generate turn-by-turn directions and the circuit-switched call can then be ended. The method 200 proceeds to step 240.

At step 240, determined route information is sent from the call center 20 via the packet-switched call and is received at the vehicle 12. The determined route information can include turn-by-turn directions generated by the call center 20. Once the call center 20 receives the address or point of interest description, whether verbal or keyboard-generated, the call center 20 can access appropriate computing resources, such as computer 18, and generate geographical directions that may involve directions between two points or directions from the present location of the vehicle 12 to a geographical destination. The turn-by-turn directions can be generated as a file that contains computer-readable data, which can be used by the telematics unit 30 to audibly convey the turn-by-turn directions to the vehicle occupant and/or can be used by the vehicle navigation system to display map data on the visual display 42. The file can be packetized for transmission over the wireless carrier system 14 using the packet-switched call. If the packet-switched call was placed in the dormant/standby mode, the telematics unit 30 or call center 20 can send a message to the wireless carrier system 14 instructing the system 14 to end the dormant/standby mode before turn-by-turn directions are sent to the vehicle 12 via the packet-switched call. The method 200 proceeds to step 250.

At step 250, the determined route information is received at the vehicle 12 via the packet-switched call. The determined route information (e.g. turn-by-turn directions) can be used by the vehicle 12 in a manner discussed with respect to step 240 and the packet-switched call can be ended. The method 200 then ends.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of communicating between a vehicle and a central facility, comprising the steps of:
    (a) initiating at a vehicle a request for turn-by-turn directions;
    (b) establishing a packet-switched call between the vehicle and a central facility using a mobile dialed number (MDN) and a hotline number, provided by a wireless carrier system, that permits a plurality of simultaneous calls associated with the MDN;
    (c) offering a vehicle occupant a service option that uses a circuit-switched call;
    (d) if the vehicle occupant accepts the service option, directing the wireless carrier system to establish the circuit-switched call using the MDN while maintaining the packet-switched call in a dormant state; and
    (e) receiving determined route information at the vehicle from the central facility via the packet-switched call.

2. The method of claim 1, further comprising the step of sending the request for turn-by-turn directions via the packet-switched call.

3. The method of claim 1, further comprising the step of sending information identifying the vehicle via the packet-switched call.

4. The method of claim 3, further comprising the step of identifying the vehicle using a vehicle identification number (VIN).

5. The method of claim 3, wherein the information identifying the vehicle further comprises a geographic location of the vehicle.

6. The method of claim 1, further comprising the steps of receiving at the vehicle from the vehicle occupant a destination for turn-by-turn directions and sending the destination to the central facility via the packet switched call.

7. The method of claim 1, wherein step (c) further comprises offering a vehicle occupant an opportunity to speak with an advisor at the central facility as the service option.

8. The method of claim 1, further comprising the step of ending the circuit-switched call while simultaneously maintaining the packet-switched call.

9. A method of communicating between a vehicle and a central facility, comprising the steps of:
   (a) receiving at a central facility vehicle identity information and a request for turn-by-turn directions sent from the vehicle via a wireless carrier system;
   (b) establishing a packet-switched call between the vehicle and the central facility using a mobile dialed number (MDN) and a hotline number, provided by a wireless carrier system, that permits a plurality of simultaneous calls associated with the MDN;
   (c) receiving a request from the vehicle for a service option that uses a circuit-switched call;
   (d) directing the wireless carrier system from the central facility to establish the circuit-switched call using the MDN and to maintain the packet-switched call in a dormant state; and
   (e) sending a determined turn-by-turn route from the central facility to the vehicle via the packet-switched call.

10. The method of claim 9, further comprising the step of receiving the request for turn-by-turn directions via the packet-switched call.

11. The method of claim 9, further comprising the step of receiving the vehicle identity information via the packet-switched call.

12. The method of claim 9, further comprising the steps of receiving from the vehicle occupant a destination for turn-by-turn directions that is inputted at the vehicle via the packet switched call.

13. The method of claim 9, wherein step (c) further comprises receiving a request from the vehicle occupant to speak with an advisor at the central facility as the service option.

14. The method of claim 9, further comprising the step of ending the circuit-switched call while simultaneously maintaining the packet-switched call.

15. The method of claim 9, further comprising the step of identifying the vehicle using a vehicle identification number (VIN).

16. The method of claim 9, wherein the vehicle identity information further comprises a geographic location of the vehicle.

17. A method of communicating between a vehicle and a central facility, comprising the steps of:
   (a) receiving a request for turn-by-turn directions from a vehicle that also includes vehicle identifying information and mobile dialed number (MDN);
   (b) establishing a packet-switched call between the central facility and the vehicle via a hotline number provided by a wireless carrier system that permits a plurality of simultaneous calls associated with the MDN;
   (c) offering a vehicle occupant in the vehicle a service option that uses a circuit-switched call;
   (d) if the vehicle occupant selects the service option, then directing the wireless carrier system to establish the circuit-switched call while maintaining the packet-switched call in a dormant state, wherein both the packet-switched call and the circuit-switched call are simultaneously connected through the wireless carrier system using the MDN;
   (e) receiving voice communication for turn-by-turn directions at the central facility from the vehicle occupant via the circuit-switched call;
   (f) ending the circuit-switched call; and
   (g) sending a response to the request for turn-by-turn directions via the re-activated packet-switched call.

18. The method of claim 17, wherein the vehicle identifying information further comprises a geographic location of the vehicle.

* * * * *